(12) United States Patent
Agnew et al.

(10) Patent No.: US 10,381,669 B2
(45) Date of Patent: Aug. 13, 2019

(54) STEAM REFORMER FOR IN-BLOCK FUEL CELL REFORMING

(71) Applicant: LG Fuel Cell Systems Inc., North Canton, OH (US)

(72) Inventors: Gerry D. Agnew, Uttoxeter (GB); John R. Budge, Beachwood, OH (US); Robert H. Cunningham, Derby (GB); Eric Dean, Derby (GB)

(73) Assignee: LG FUEL CELL SYSTEMS INC., North Canton, OH (US)

( * ) Notice: Subject to any disclaimer, the term of this patent is extended or adjusted under 35 U.S.C. 154(b) by 144 days.

(21) Appl. No.: 15/209,372

(22) Filed: Jul. 13, 2016

(65) Prior Publication Data

US 2018/0019490 A1    Jan. 18, 2018

(51) Int. Cl.
| | |
|---|---|
| *H01M 8/0612* | (2016.01) |
| *H01M 8/0637* | (2016.01) |
| *H01M 8/04746* | (2016.01) |
| *H01M 8/124* | (2016.01) |

(52) U.S. Cl.
CPC ..... *H01M 8/0618* (2013.01); *H01M 8/04753* (2013.01); *H01M 8/04776* (2013.01); *H01M 8/0637* (2013.01); *H01M 2008/1293* (2013.01); *Y02E 60/566* (2013.01)

(58) Field of Classification Search
CPC combination set(s) only.
See application file for complete search history.

(56) References Cited

U.S. PATENT DOCUMENTS

| | | |
|---|---|---|
| 3,462,306 A | 8/1969 | Schneider |
| 4,374,184 A | 2/1983 | Somers et al. |
| 5,212,022 A | 5/1993 | Takahashi et al. |
| 7,691,521 B2 | 4/2010 | Ahmed et al. |
| 8,435,683 B2 | 5/2013 | Finnerty et al. |
| 8,449,702 B2 | 5/2013 | Batawi et al. |
| 2005/0102902 A1 | 5/2005 | Kamijo |
| 2005/0170234 A1 | 8/2005 | Liu et al. |
| 2007/0287048 A1 | 12/2007 | Brown et al. |

(Continued)

FOREIGN PATENT DOCUMENTS

| | | |
|---|---|---|
| EP | 673074 B1 | 7/1998 |
| EP | 1617501 A2 | 1/2006 |
| WO | 2011/159064 A3 | 12/2011 |

OTHER PUBLICATIONS

International Searching Authority, International Search Report for corresponding International Application No. PCT/US17/39952 dated Nov. 2, 2017, 4pgs.

*Primary Examiner* — Christopher P Domone
(74) *Attorney, Agent, or Firm* — Dentons US LLP

(57) ABSTRACT

A fuel cell system and method is provided to control the volumetric ratio of a reformate and unreformed hydrocarbon fuel supplied to a fuel cell configured for in-stack reforming. The system includes a reformer having a number of high and low steam reforming activity channels which provide a full equilibrated fuel stream and a fuel stream having hydrocarbon levels slight lower than the hydrocarbon levels of the hydrocarbon fuel supplied to the reformer, respectively. The fuel streams can be mixed and supplied to the fuel cell to provide in-stack reforming while reducing or inhibiting the formation of carbon in the fuel stack.

8 Claims, 1 Drawing Sheet

(56) References Cited

U.S. PATENT DOCUMENTS

| | | |
|---|---|---|
| 2008/0187799 A1* | 8/2008 | Mergler ............ H01M 8/04022 |
| | | 429/425 |
| 2009/0229239 A1 | 9/2009 | Keller et al. |
| 2011/0038775 A1* | 2/2011 | Takahashi .............. B01J 21/005 |
| | | 423/245.1 |
| 2011/0039183 A1 | 2/2011 | Armstrong et al. |
| 2012/0058406 A1 | 3/2012 | Lee et al. |
| 2014/0087281 A1 | 3/2014 | Budge |

\* cited by examiner

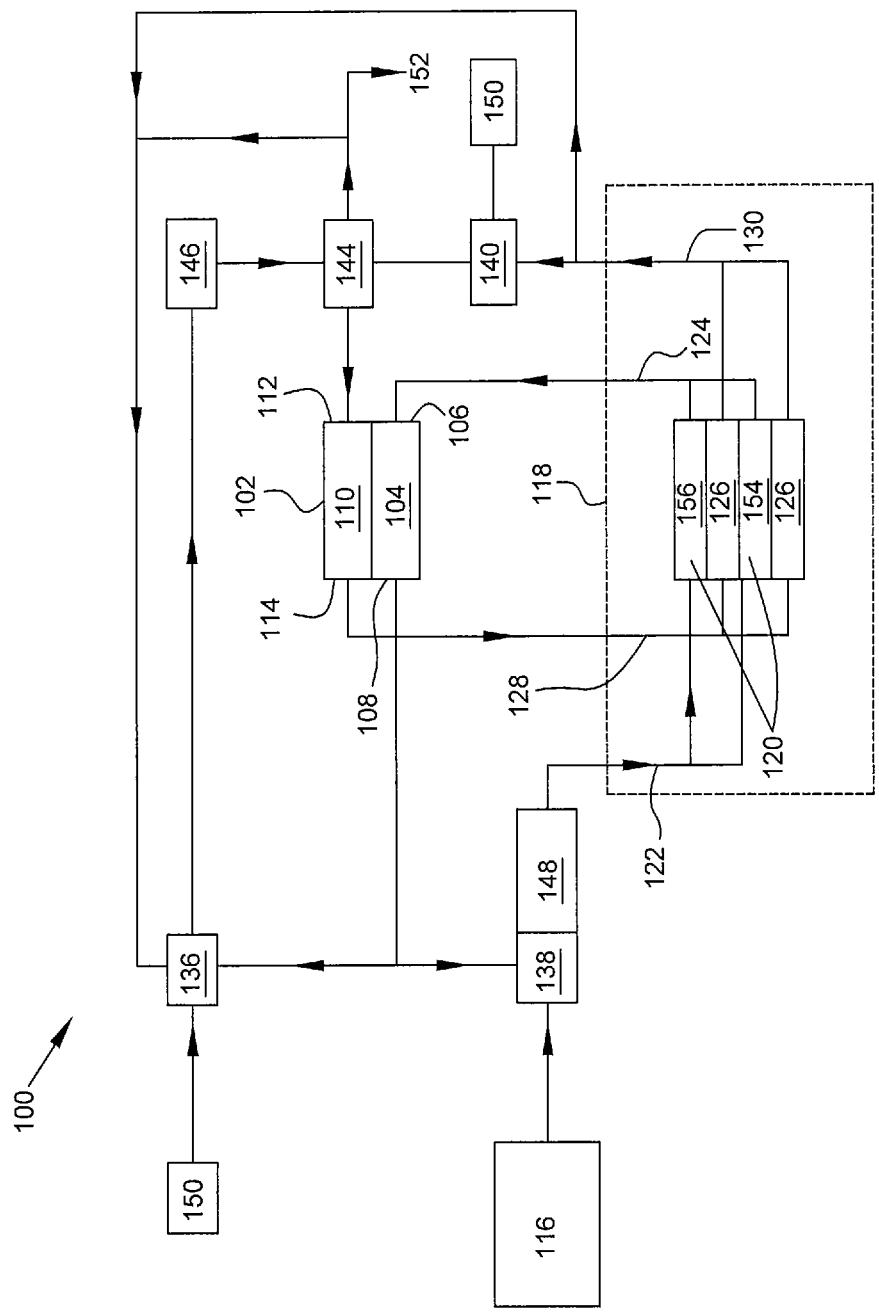

STEAM REFORMER FOR IN-BLOCK FUEL CELL REFORMING

FIELD

This disclosure generally relates to fuel cells. More specifically, this disclosure is related to systems and methods which may support internally-reforming fuel cells.

BACKGROUND

A fuel cell is an electrochemical system in which a fuel (such as hydrogen) is reacted with an oxidant (such as oxygen) at high temperature to generate electricity. One type of fuel cell is the solid oxide fuel cell (SOFC). The basic components of a SOFC may include an anode, a cathode, an electrolyte, and an interconnect. The fuel may be supplied to the anode, and the oxidant may be supplied to the cathode of the fuel cell. At the cathode, electrons ionize the oxidant. The electrolyte may comprise a material that allows the ionized oxidant to pass therethrough to the anode while simultaneously being impervious to the fluid fuel and oxidant. At the anode, the fuel is combined with the ionized oxidant in a reaction that releases electrons that are conducted back to the cathode through an external circuit or to the cathode of an adjacent SOFC via the interconnect. Heat, generated from ohmic losses, is removed from the fuel cell by either the anode or cathode exhaust or is radiated to the environment.

A SOFC may be structured, e.g., as a segment-in-series or in-plane series arrangement of individual cells. The oxidant is typically introduced at one end of the series of cells and flows over the remaining cells until reaching the cathode exhaust outlet. Each fuel cell transfers heat into the oxidant thereby raising its temperature, and forming a temperature gradient which increases from the oxidant inlet to the exhaust. A temperature gradient may also develop in the fuel cell which increases from the oxidant inlet to the oxidant exhaust. These temperature gradients cause thermal stresses that may cause material degradation or failure of the fuel cell components, or may reduce fuel cell performance.

The anode of a SOFC may be a mixed cermet comprising nickel and zirconia (such as, e.g., yttria stabilized zirconia (YSZ)) or nickel and ceria (such as, e.g., gadolinia dope ceria (GDC)). Nickel, and other materials, may function not only to support the chemical reaction between the fuel and the ionized oxidant but may have catalytic properties which allow the anode to reform a hydrocarbon fuel within the fuel cell. One method of reforming the hydrocarbon fuel is steam reforming of methane ($CH_4$), an endothermic reaction (Equation 1):

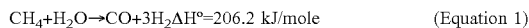
$$CH_4 + H_2O \rightarrow CO + 3H_2 \quad \Delta H° = 206.2 \text{ kJ/mole} \quad \text{(Equation 1)}$$

The heat necessary for methane steam reforming could be supplied directly from the heat released within the stack from the ohmic losses. This direct heat transfer helps to cool the stack, reducing thermal stresses and improving overall stack performance. However, in-stack reforming introduces several technical challenges. The unreformed methane must be supplied in the correct amount to avoid excessive cooling of the fuel cell and in the correct manner to avoid localized cooling. Additionally, hydrocarbon fuels have a propensity to form carbon, particularly when a significant amount of reforming is performed (Equation 2):

$$C_xH_{2x+2} \rightarrow C + (x+1)H_2 \quad \text{(Equation 2)}$$

Carbon formation can cause fouling and degradation of fuel cell components through anode delamination, metal dusting and other failure mechanisms.

Consequently, supplying a mixture of a syngas reformed external to the fuel cell and an unreformed fuel to the anode may provide a better balance of system performance and durability than supplying either reformate or unreformed fuel alone. However, the ratio of reformed and unreformed fuel must be precisely controlled. If the ratio is too high, the large temperature gradient across the fuel stack will remain. If it is too low, carbon formation will result in loss of performance.

There remains a need for precise control of the ratio of reformed and unreformed fuels delivered to a fuel cell stack to ensure that the proper amount of reforming occurs internally to the fuel cell.

SUMMARY

In accordance with some embodiments of the present disclosure, a reformer having one or more high reforming activity channels and one or more low reforming activity channels is provided. The reformer, which may be a steam reformer, is configured to deliver, over the life of the reformer, the required level of hydrocarbons to a fuel cell stack for internal reforming therein. This internal reforming improves fuel cell cost, power density and efficiency by permitting more direct cooling, reducing air-flow for a given power consumption, and lowering cost overhead. System efficiency is improved by recuperating waste heat within the fuel cell stack. Further, this design permits some of the disclosed embodiments to accommodate a wide range of in-stack reforming fuel cell designs and minimizes the risk for carbon formation.

In a fuel cell system comprising a source of hydrocarbon fuel, a reformer, which may be a steam reformer, for receiving the hydrocarbon fuel and converting at least a portion of the hydrocarbon fuel to a reformate, and a fuel cell stack configured for in-stack reforming of unreformed hydrocarbon fuel which may be received as a mixture of reformate and unreformed hydrocarbon fuel at an anode inlet, a method of controlling the volumetric ratio of the reformate and unreformed hydrocarbon fuel in the mixture is provided in accordance with some embodiments of the present disclosure. The method may comprise reforming a portion of the hydrocarbon fuel in a number of high steam reforming activity channels in the reformer that output a fuel stream comprising a fully equilibrated reformate mixture, reforming a portion of the hydrocarbon fuel in a number of low steam reforming activity channels in the reformer that output a fuel stream having hydrocarbon levels that are only slightly lower than in the hydrocarbon fuel. The fuel stream output from the high steam reforming activity channels and the low steam reforming activity channels may be mixed and providing to the anode inlet of the fuel cell stack. The method further comprises selecting the ratio of the number of high steam reforming activity channels to the number of low steam reactivity channels and the activity levels of the channels to thereby control the volumetric ratio of reformate and the unreformed hydrocarbon fuel in the mixture.

In accordance with some embodiments of the present disclosure, a method of operating a fuel cell system configure for internal reforming of a hydrocarbon feel in a fuel cell stack is provided. The method may comprise supplying the hydrocarbon fuel to the system, feeding a portion of the hydrocarbon fuel to a plurality of high steam reforming activity channels in a steam reformer to thereby provide a fuel stream comprising a fully equilibrated reformate mixture at the prevailing process conditions, feeding a portion of the hydrocarbon fuel to a plurality of low steam reforming activity channels in a steam reformer to thereby provide a fuel having hydrocarbon levels that are only slightly lower than in the hydrocarbon fuel, combining the fuel provided by the high steam reforming activity channels and the low steam forming activity channels, and supplying the combined fuel to an anode inlet of the fuel cell stack.

In accordance with some embodiments of the present disclosure, a fuel cell system is provided. The fuel cell system may comprise a fuel cell stack configured for internal reforming of a hydrocarbon fuel, and the fuel cells stack may comprise an anode portion in fluid communication with an anode inlet and an anode exhaust, and a cathode portion in fluid communication with a cathode inlet and a cathode exhaust. The system may further comprise a source of hydrocarbon fuel and a reformer unit for converting hydrocarbon fuel to reformate. The reformer unit may comprise one or more high reforming activity cold-side channels configured to convert a first percentage of the hydrocarbon fuel passing therethrough to reformate, one or more low reforming activity cold-side channels configure to convert a second percentage of the hydrocarbon fuel passing therethrough to reformate, the second percentage being lower than the first percentage, a fuel supply conduit in fluid communication with said fuel source and said high reforming activity and low reforming activity cold-side channels, a fuel exhaust conduit in fluid communication with said high reforming activity and low reforming activity cold-side channels and said anode inlet, the fuel exhaust conduit being configured to supply the fuel exhausted from the cold-side channels to the anode inlet of the fuel stack, one or more hot-side channels configured to provide a passage for a gas through the reforming unit, the gas being at a temperature greater than the temperature of the fluid in the cold-side channels, the hot-side channels being in sufficient proximity to the cold-side channels to effect heat transfer between the fluids flowing through the respective channels, and a gas supply conduit configured to supply gas to the hot-side channels.

In accordance with some embodiments of the present disclosure, a method of controlling the volumetric ratio of the reformate and unreformed hydrocarbon fuel in a mixture supplied to an anode inlet of a fuel cell stack in a fuel cell system is provided. The fuel cell system may comprise a source of hydrocarbon fuel, a steam reformer for receiving the hydrocarbon fuel and converting at least a portion of the hydrocarbon fuel to reformate, and a fuel cell stack configured for in-stack reforming of unreformed hydrocarbon fuel and having an anode inlet for receiving a mixture of the reformate and unreformed fuel. The method comprises reforming a potion of the hydrocarbon fuel in a number of channels having a first activity level in the reformer to output a first fuel stream, reforming a portion of the hydrocarbon fuel in a number of channels having a second activity level in the reforming to output a second fuel stream, wherein the second activity level is different from the first activity level, and mixing the first and second fuel steams and providing the mixture to the anode inlet of the fuel cell stack.

These and many other advantages of the present subject matter will be readily apparent to one skilled in the art to which the disclosure pertains from a perusal of the claims, the appended drawings, and the following detail description of the embodiments.

BRIEF DESCRIPTION OF THE DRAWINGS

FIG. 1 is a system diagram of a fuel cell system with a reformer having high and low activity channels.

Referring to the drawings, some aspects of non-limiting examples of a fuel cell system in accordance with an embodiment of the present disclosure are schematically depicted. In the drawings, various features, components and interrelationships therebetween of aspects of an embodiment of the present disclosure are depicted. However, the present disclosure is not limited to the particular embodiments presented and the components, features and interrelationships therebetween as are illustrated in the drawings and described herein.

DETAILED DESCRIPTION

The objectives and advantages of the claimed subject matter will become apparent from the following detailed description of the preferred embodiments thereof in connection with the accompanying drawings.

A system diagram of a fuel cell system 100 with a reformer unit 118 having high and low activity reforming channels in accordance with some embodiments of the present disclosure is illustrated in FIG. 1. The system 100 comprises at least one fuel cell stack 102, a source of hydrocarbon fuel 116, a reformer 118 (which may also be referred to as reformer unit), and an oxidant source 150. The fuel cell stack 102 comprises an anode portion 104 in fluid communication with an anode inlet 106 and an anode exhaust 108, and a cathode portion 110 in fluid communication with a cathode inlet 112 and a cathode exhaust 114 and is configured to internally reform an unreformed hydrocarbon fuel. The fuel cell stack 102 may receive a mixture of reformed and unreformed hydrocarbon fuel at the anode inlet 106, and stack 102 is configured to internally reforming at least a portion of the mixture. The fuel cell stack 102 may be of any fuel cell design, and is preferably a SOFC.

The source of hydrocarbon fuel 116 may provide any type of hydrocarbon fuel, such as, e.g., methane, to the fuel cell system 100. The source of oxidant 150 may provide air or other oxidant to the fuel cell system 100.

The reformer unit 118 converts at least a portion of the hydrocarbon fuel received from the source of hydrocarbon fuel 116 into a reformate and comprises one or more cold-side channels 120, a fuel supply conduit 122, a fuel exhaust conduit 124, one or more hot-side channels 126, a gas supply conduit 128, and a cathode inlet conduit 130. In a preferred embodiment the reformer unit 118 is a steam reformer.

The cold-side channels 120 provide reforming passages that reform the fuel supplied from the source of hydrocarbon fuel 116 into a reformate. The cold-side channels 120 may be referred to as a reforming section. The reforming passages may contain a catalyst comprising at least one Group VIII metal, and preferably one Group VIII noble metal, such as, e.g., platinum, palladium, rhodium, ruthenium, iridium or a combination thereof. Catalysts comprising rhodium or rhodium and platinum are preferred. Preferably, the catalyst is a hydrocarbon steam reforming catalyst. The catalyst may contain active metals in any suitable amount that achieves the desired amount of hydrocarbon conversion for a particular channel. For example, the active catalyst metals may comprise 0.00001 to 40 wt % of the catalyst. In some embodiments, the active catalyst metals may comprise 0.00005 to 15 wt % of the catalyst. In some embodiments, the active catalyst metals may comprise 0.0005 to 5 wt % of the catalyst. The active metal content of the catalyst in a high activity reforming channel should be sufficient to ensure a near equilibrium hydrocarbon conversion over the life of the reformer. In some embodiments, the high activity channels comprise active metals in the range of 0.5 to 5 wt % of the catalyst of these channels. In some embodiments, active metals of a high activity channel catalyst comprise 1.8 wt % of the catalyst of that channel. The active metal content of the catalyst of the low activity channels should be configured to provide for less than a 10% conversion rate of hydrocarbon fuel to syngas. In some embodiments, a low activity channel catalyst comprises active metals in the range of 0.0005 to 0.1 wt % of the catalyst of this channel. In some embodiments, active metals of the low activity channel catalyst comprise 0.00098 wt % of the catalyst of this channel. In some embodiments, the low activity channel has no active catalyst and functions, with the regard to the reforming aspect of the channel, essentially as an integrated bypass.

In some embodiments, the catalyst may contain one or more promoter elements to improve the catalyst activity, durability, suppress carbon formation, or any combination of these or other improvements. The promoter elements may include, but are not limited to, elements from Groups IIa-VIIa, Groups Ib-Vb, lanthanide and actinide series elements, or any combination thereof. Promoters such as magnesia, ceria, and baria may suppress carbon formation. The promoter elements may be present in any amount ranging from 0.01 to 10 wt % of the catalyst. In some embodiments, the promoter elements may be present in amount ranging from 0.01 to 5 wt % of the catalyst. The embodiments of the present disclosure are not so limited and may contain any amount of active metal, promoter elements, or both in ranges outside of those expressly listed.

The catalyst may be supported on a carrier comprising a refractory oxide such as, e.g., silica, alumina, titania, zirconia, tungsten oxides, and mixtures thereof, although the disclosure is not limited to refractory oxides. In some embodiments, the carrier may comprise a mixed refractory oxide compound comprising at least two cations. The catalyst active and promoter elements may be deposited on the carrier by any of a number of techniques. The catalyst may be deposited by impregnation onto the carrier, e.g., by contacting the carrier materials with a solution of the catalyst followed by drying and calcining the structure. The catalyst is preferably coated onto the plates of a heat exchanger or on inserts placed into the cold-side channels 120. Catalyst pellets of a suitable size and shape may also be placed in the cold-side channel 120. However, the embodiments of the present disclosure are not so limited, and any means of incorporating the catalyst into the cold-side channels 120 may be used, such as, e.g., using a porous support structure.

The cold-side channels 120 of the reformer 118 may be comprise two or more types of channels having different reforming activity levels. These channels may be high reforming activity cold-side channels 156 and low reforming activity cold-side channels 154. The one or more high reforming activity cold-side channels 156 are configured to convert a first percentage of the hydrocarbon fuel from the source of hydrocarbon fuel 116 passing through the high reforming activity cold-side channels 156 into a reformate. In some embodiments, the first percentage is 75-100%. In some embodiments, the first percentage is 90-100%. In some embodiments, the first percentage is 95-100%. In some embodiments, the first percentage is 99-100%. In some embodiments, the first percentage is 97-98%. The one or more low reforming activity cold-side channels 154 are configured to convert a second percentage of the hydrocarbon fuel from the source of hydrocarbon fuel 116 passing through the low reforming activity cold-side channels 154 into a reformate. The second percentage is lower than the first percentage. In some embodiments, the second percentage is less than 10%. In some embodiments, the second percentage is less than 5%. In some embodiments, the second percentage is less than 1%.

The percentage of conversion, or activity level of each channel is determined by the catalyst loading and dimensions of that channel. Preferably, the loading and dimensions of the high activity channels 156 are chosen to achieve an equilibrium conversion of methane over the life of the component.

For the low activity channels 154, the catalyst loading and dimensions are chosen so that preferably no more than 10% of the methane fuel is reformed into carbon monoxide and hydrogen. The lower activity level of the low activity channels 154 will cause only a slight reduction in the hydrocarbon levels from the hydrocarbon levels found in the hydrocarbon fuel supplied to the reformer.

The ratio of high to low reforming activity channels 156, 154 may be adjusted to match the desired amount of in-stack reforming while minimizing the risk for carbon formation associated by feeding a partially reformed fuel to the fuel cell stack 102. In some embodiments, the ratio of high to low reforming activity channels 156, 154 is 1:1. Assuming that the high activity channels 156 converts 100% of an unreformed fuel into a syngas, and that the low activity channels 154 convert 0% of the unreformed fuel into a sygnas, a ratio of high to low activity channels of 1:1 produces an effective conversion rate of the reformer of 50%. In some embodiments, the ratio of high to low reforming activity channels 156, 154 is 1:3. Using the above assumptions, this ratio of high to low activity channels produces an effective conversion rate for the reformer of 25%. In some embodiments, the ratio of high to low activity channels is between 1:10 and 10:1.

The high and low activity reforming channels 156, 154 are preferably arranged in an alternating configuration, although any arrangement may be used. Alternating the channels reduces thermal stresses in the reformer 118 by distributing the thermal loads of the catalyzed endothermic steam reforming reactions in the high activity reforming channels across the reformer.

The cold-side channels 120 are in fluid communication with the source of hydrocarbon fuel 116 via a fuel supply conduit 122 that functions to transport the hydrocarbon fuel from the source of the hydrocarbon fuel 116 to the cold-side channels 120 of the reformer unit 118. The fuel may be supplied to the high and low reforming activity cold-side channels 156 and 154 via a common plenum, or via one or more plenums or input lines for one or more of the high and low reforming activity cold-side channels 156 and 154. Using separate input lines or plenums allows for individualized control of the fuel flow through each type of channel, each individual channel, or both. Dynamic flow control may also be used to alter the effective number of high activity channels 156, low activity channels 154, or both in the reformer at any given time to adjust the amount of unreformed fuel, as well as the mixture of unreformed fuel to reformate, supplied to the fuel cell stack 102 during operation.

In accordance with some embodiments, the fuel cell system 100 may further comprise a higher hydrocarbon reduction unit 148 which is in fluid communication with both the source of hydrocarbon fuel 116 and the fuel supply conduit 122. The higher hydrocarbon reduction unit 148 may be used upstream of the reformer unit 118 to reduce the level of higher hydrocarbons fed to the reformer. By reducing the level of higher hydrocarbons fed to the reformer unit 118, the higher hydrocarbon reduction unit 148 reduces the risk of carbon formation within the fuel cell system 100.

As the hydrocarbon fuel passes through the reforming passages of the high and low reforming activity cold-side channels 156 and 154, the fuel is at least partially reformed in to syngas (hydrogen and carbon monoxide). The reformate from the high and low reforming activity cold-side channels 156, 154 flows into the fuel exhaust conduit 124, which may also be referred to as an outlet plenum, that is in fluid communication with both the high and low reforming activity cold-side channels 156 and 154 and the anode inlet 106. The fuel exhaust conduit 124 is configured to supply the fuel exhausted from the high and low reforming activity cold-side channels to the anode inlet 106 of the fuel cell stack 102.

Providing a combination of high and low activity channels and controlling the activity of those channels allows the reformer 118 to overcome the difficulties of supplying a precise amount of unreformed fuel to the fuel cell stack 102 over the life of the reformer. Generally, a reformer does not maintain a uniform temperature over the catalysts through the life and over the length of the unit as the catalyst degrades and is deactivated. By providing at least one high activity channel, the channel may have a sufficient length and activity level to account for these changes while maintaining equilibrium conversion of the hydrocarbon fuel over the life of the reformer. Therefore, the percentage of conversion of fuel from the high activity channel will be constant over the life of the component. The low activity channel primarily serves to pre-heat the fuel stream and also reform any higher hydrocarbons that were not removed by the higher hydrocarbon reduction unit 118 and thereby reducing the risk of carbon formation in the fuel cell stack 102. With minimal reformation occurring in the low activity channel, the low activity channels are also able to maintain a relatively constant percentage of hydrocarbon conversion over the life of the reformer. Therefore, the overall reformation is constant allowing the system to continue to provide a precise amount of unreformed hydrocarbon fuel to the fuel cell stack over the life of the reformer.

This result is not achievable with a conventional reformer loaded to achieve some intermediate level of reforming, such as, e.g., 50% of the total hydrocarbon stream supplied to the fuel cell stack. The catalysts of such a reformer will suffer degradation and deactivation over the life of the component, thereby decreasing the conversion percentage of the total fuel stream as the component ages.

Reformer Unit 118 also comprises one or more hot-side channels 126, which may referred to as a heat exchange section. The hot-side channels 126 provide a passage for a gas, such as, e.g., the cathode exhaust gas, to flow through the reforming unit 118. While the cathode exhaust gas is provided as an example, it will be understood that any gas at a temperature greater than the temperature of the fluid in the cold-side channels 120 may be supplied to the hot-side channels 126. These channels 126 may be arranged in a sufficiently close proximity and orientation to the cold-side channels 120 in order to effect the transfer of heat between fluids flowing in the hot-side channels 126 and the cold-side channels 120. The fluid flows in these channels maybe oriented for parallel flow, counter flow, cross flow, or any other heat exchanger configuration. Regardless of the proximity of the heat exchange section to the reforming section, both components are arranged to be in thermal communication with one another.

The hot-side channels 126 of reformer unit 118 are in fluid communication with the cathode exhaust 114 via the cathode exhaust (or other gas) conduit 128. In some embodiments, only a portion of the gas exhausted from cathode exhaust 114 may be supplied to the reformer 118 via the gas supply conduit 128. Additionally, the hot-side channels 126 may be in fluid communication with the cathode inlet 112 via the cathode inlet conduit 130. In accordance with some embodiments, the cathode exhaust in the cathode inlet conduit 130 is supplied to the suction side of a cathode ejector 140. The oxidant source 150 may provide the motive energy which operates the cathode ejector 140. The cathode exhaust and oxidant may flow through the cold-side channels of a heat exchanger 144 prior to being supplied to the cathode inlet 112. The hot-side channels of heat exchanger 144 may provide passage ways for a combustor exhaust gas flow or other hot fluid which transfers heat into the combined cathode exhaust-oxidant flow supplied to the cathode inlet 112.

In accordance with some embodiments of the present disclosure, the fuel cell system 100 may further comprise one or more anode exhaust recycle lines. A portion of the anode exhaust may be drawn into an anode ejector 138. The motive force for the anode ejector 138 may be the source of hydrocarbon fuel 116, which may be pressurized by any conventional means. The recycled anode exhaust may then be combined with the source of hydrocarbon fuel 116 supplied to the reformer unit 118.

Another portion of the anode exhaust may be drawn into an auxiliary ejector 136. The motive force for the auxiliary ejector 136 may be supplied by the oxidant source 150. The combined oxidant—anode exhaust mixture may then flow to a combustor 146 that supplies a combustion product to the hot-side channels of heat exchanger 144. This combustion product may then be vented to the environment at 152. Other systems may be supplied with these combustion products or other portions of the anode exhaust, e.g., to power a turbine which may pressurize various flows in the fuel cell.

In accordance with some embodiments of the present disclosure, a method of controlling the volumetric ratio of the reformate and unreformed hydrocarbon fuel supplied to a fuel cell is presented. The method may be used for a fuel cell system which may comprise a source of hydrocarbon fuel, a steam reformer configured to receive the hydrocarbon fuel and convert at least a portion of the hydrocarbon fuel to reformate (Equation 1) and a fuel cell configured for in stack reforming of the unreformed hydrocarbon fuel. The fuel cell system may comprise components as described above. The fuel stack may have an anode inlet which receives a mixture of the reformate and unreformed hydrocarbon fuel. The method comprises reforming a portion of the hydrocarbon fuel in a number of channels. The reformer may comprise two or more types of channels, each channel having an activity level which is different from at least on other type of channel. In some embodiments, the reformer may comprise three or more different types of channels, each with a different level of activity and each being configured to achieve a different amount of reformation of the hydrocarbon fuel. In some embodiments these channels may comprise high steam-reforming-activity channels in the reformer for outputting a fuel stream having a high concentration of reformate mixture, which may comprise a fully-equilibrated reformate mixture, at the prevailing process conditions. In some embodiments these channels may comprise low steam reforming activity channels in the reformer to output a fuel stream having a low concentration of reformate which may have hydrocarbon levels that are only slightly lower than the hydrocarbon levels in the fuel input stream (e.g., the hydrocarbon fuel received by the reformer). The method may comprise reforming a portion of the hydrocarbon fuel in a number of high steam-reforming-activity channels in the reformer and outputting a fuel stream having a high concentration of reformate mixture, which may comprise a fully equilibrated reformate mixture, at the prevailing process conditions. The method may further comprises reforming a portion of the hydrocarbon fuel in a number of low steam reforming activity channels in the reformer to output a fuel stream having a low concentration of reformate which may have hydrocarbon levels that are only slightly lower than the hydrocarbon levels in the fuel input stream (e.g., the hydrocarbon fuel received by the reformer). The method further includes mixing the fuel stream output from the high and low steam reforming activity channels and providing the mixture to the anode inlet of the fuel cell stack. The method further including selecting the ratio of the number of high steam reforming activity channels to low steam reactivity channels and the activity levels of these channels to thereby control the volumetric ratio of reformate and the unreformed hydrocarbon fuel in the mixture. The method may further comprise providing heat to the fuel in the high and low steam reforming activity channels by directing at least a portion of a cathode exhaust from the fuel cell stack to a plurality of channels in the reformer. In some embodiments, a gas other than the cathode exhaust may provide heat to the fuel in the high and low activity channels.

In some embodiments the method may further comprise reforming a portion of the hydrocarbon in a number of channels having a third activity level in the reformer to output a third fuel stream having hydrocarbon levels less than the second fuel stream and greater than the first fuel stream. The third fuel stream may be mixed with the first and second streams.

In accordance with some embodiments of the present disclosure, a method of operating a fuel cell system configured for internal reforming of a hydrocarbon fuel is presented. The method may comprise supplying a hydrocarbon fuel to the fuel cell system, feeding a portion of the hydrocarbon fuel to a plurality of high steam reforming activity channels in a steam reformer to thereby provide a fuel having a high concentration of reformate, which may comprise a fully equilibrated reformate mixture, at the prevailing process conditions, feeding a portion of the hydrocarbon fuel to a plurality of low steam reforming activity channels in a steam reformer to thereby provide a fuel having a low concentration of reformate which may have hydrocarbon levels that are only slightly lower than the hydrocarbon levels in hydrocarbon fuel feed to the high and low steam reforming activity channels, combing the fuel provided by the high steam reforming activity channels and the low steam reforming activity channels, and supplying the combined fuel to an anode inlet of the fuel cell stack. The method may further comprise heating the fuel in the high and low steam reforming activity channels by transferring heat from a gas supplied from a cathode exhaust of the fuel cell stack.

While preferred embodiments of the present subject matter have been described, it is to be understood that the embodiments described are illustrative only and that the scope of the subject matter is to be defined solely by the appended claims when accorded a full range of equivalence, and the many variations and modifications naturally occurring to those of skill in the art from a perusal hereof.

We claim:
1. In a fuel cell system comprising:
   a source of a hydrocarbon fuel;
   a steam reformer for receiving the hydrocarbon fuel and converting at least a portion of the hydrocarbon fuel to reformate; and
   a fuel cell stack configured for in-stack reforming of unreformed hydrocarbon fuel, said fuel cell stack having an anode inlet for receiving a mixture of the reformate and unreformed hydrocarbon fuel,
   a method of controlling the volumetric ratio of the reformate and unreformed hydrocarbon fuel in the mixture comprising:
   reforming a portion of the hydrocarbon fuel in a number of first channels in the reformer that output a fuel stream comprising a fully equilibrated reformate mixture;
   reforming a portion of the hydrocarbon fuel in a number of second channels in the reformer that output a fuel stream having a concentration of reformate lower than the fully equilibrated reformer mixture;
   mixing the fuel stream output from the first channels and the second channels and providing the mixture to the anode inlet of the fuel cell stack; and
   selecting a ratio of the number of the first channels to the number of the second channels and activity levels of the channels to thereby control a volumetric ratio of reformate to the unreformed hydrocarbon fuel in the mixture.

2. The method of claim 1 comprising providing heat to the fuel in the first and the second channels by directing at least a portion of a cathode exhaust from the fuel cell stack to a plurality of channels in the reformer.

3. In a fuel cell system configured for internal reforming of a hydrocarbon fuel in a fuel cell stack, a method of operation comprising:
   supplying a hydrocarbon fuel to the system;
   feeding a portion of the hydrocarbon fuel to a plurality of first channels in a steam reformer to thereby provide a fuel stream comprising a fully equilibrated reformate mixture;
   feeding a portion of the hydrocarbon fuel to a plurality of second channels in a steam reformer to thereby provide a fuel having a concentration of reformate lower than the fully equilibrated reformer mixture;
   combining the fuel provided by the first channels and the second channels; and
   supplying the combined fuel to an anode inlet of the fuel cell stack.

4. The method of claim 3 further comprising heating the fuel in the first channels and the second channels by transferring heat from a gas supplied from a cathode exhaust of the fuel cell stack.

5. In a fuel cell system comprising:
   a source of a hydrocarbon fuel;
   a steam reformer for receiving the hydrocarbon fuel and converting at least a portion of the hydrocarbon fuel to reformate; and
   a fuel cell stack configured for in-stack reforming of unreformed hydrocarbon fuel, said fuel cell stack having an anode inlet for receiving a mixture of the reformate and unreformed hydrocarbon fuel,
   a method of controlling a volumetric ratio of the reformate to unreformed hydrocarbon fuel in the mixture comprising:
   reforming a portion of the hydrocarbon fuel in a number of channels having a first activity level in the reformer to output a first fuel stream;
   reforming a portion of the hydrocarbon fuel in a number of channels having a second activity level in the reformer to output a second fuel stream, wherein the second activity level is different from the first activity level;

mixing the first and second fuel streams and providing the mixture to the anode inlet of the fuel cell stack.

6. The method of claim 5, wherein said first fuel stream comprises a fully equilibrated reformate.

7. The method of claim 5, wherein said second fuel stream has a concentration of reformate lower than the first fuel stream.

8. The method of claim 5, further comprising reforming a portion of the hydrocarbon fuel in a number of channels having a third activity level in the reformer to output a third fuel stream, said third fuel stream having hydrocarbon levels less than the second fuel stream and greater than the first fuel stream.

* * * * *